(12) United States Patent
Cho (10) Patent No.: US 9,673,429 B2
(45) Date of Patent: Jun. 6, 2017

(54) BATTERY PACK ACCOMODATING DIFFERENT SIZES OF BATTERIES

(71) Applicant: Samsung SDI Co., Ltd., Yongin, Gyeonggi-do (KR)

(72) Inventor: Mansik Cho, Yongin (KR)

(73) Assignee: Samsung SDI Co., Ltd., Yongin (KR)

( * ) Notice: Subject to any disclaimer, the term of this patent is extended or adjusted under 35 U.S.C. 154(b) by 593 days.

(21) Appl. No.: 13/874,979

(22) Filed: May 1, 2013

(65) Prior Publication Data

US 2014/0199570 A1 Jul. 17, 2014

(30) Foreign Application Priority Data

Jan. 16, 2013 (KR) .................. 10-2013-0004980

(51) Int. Cl.
*H01M 2/10* (2006.01)
*H01M 10/48* (2006.01)

(52) U.S. Cl.
CPC ....... *H01M 2/1033* (2013.01); *H01M 10/488* (2013.01)

(58) Field of Classification Search
CPC .................................................... H02J 7/0045
USPC ..... 429/149–160, 163–187; 29/623.1–623.5; 206/703; 221/282
See application file for complete search history.

(56) References Cited

U.S. PATENT DOCUMENTS

| | | | | |
|---|---|---|---|---|
| 9,005,791 B2* | 4/2015 | Kong | ...................... | H01M 2/00 219/117.1 |
| 2003/0146734 A1* | 8/2003 | Kozu | ................... | H01M 2/021 320/107 |
| 2006/0076925 A1* | 4/2006 | Fukushima | ......... | H01M 2/1022 320/112 |
| 2008/0185992 A1* | 8/2008 | Hoffman | ............... | H02J 7/0045 320/110 |
| 2009/0085553 A1* | 4/2009 | Kumar | ................... | H02J 7/0024 323/351 |
| 2009/0321303 A1* | 12/2009 | Kang | ................... | B65D 43/164 206/703 |
| 2011/0234160 A1* | 9/2011 | Smith | ................... | H02J 7/0009 320/110 |

FOREIGN PATENT DOCUMENTS

| KR | 20-0262295 Y1 | | 1/2002 |
|---|---|---|---|
| KR | 2006-0073383 A | | 6/2006 |
| KR | WO2012/008775 | * | 1/2012 |
| KR | 2012-0051237 A | | 5/2012 |

* cited by examiner

*Primary Examiner* — Imran Akram
(74) *Attorney, Agent, or Firm* — Knobbe Martens Olson & Bear LLP (57) ABSTRACT

A battery pack which includes a plurality of contact portions in a terminal accommodating portion provided in each of cell receiving portions of a plurality of battery cells, so that one selected from the plurality of contact portions can be electrically connected to electrode terminals of the battery cells even if the plurality of battery cells have different widths of wide walls. In addition, since the battery pack includes a series/parallel switch provided outside an external pack, a connection method of a plurality of battery cells provided inside the external pack can be switched to series/parallel connection. Further, since the battery pack includes a capacity display unit provided outside an external pack, capacity levels of a plurality of battery cells provided inside the external pack can be identified.

19 Claims, 4 Drawing Sheets

BATTERY PACK ACCOMODATING DIFFERENT SIZES OF BATTERIES

CROSS-REFERENCE TO RELATED APPLICATIONS

This application claims priority to and the benefit of Korean Patent Application No. 10-2013-0004980, filed on Jan. 16, 2013, the entire content of which is incorporated herein by reference.

BACKGROUND OF THE INVENTION

Field of the Invention

Aspects of the present invention relate to a battery pack.

Description of the Related Art

In general, battery packs are used in a range of portable electronic devices such as cellular phones, personal communications service (PCS), notebooks, camcorders, or personal digital assistants (PDA). The battery packs are manufactured by integrating several battery cells into one pack, where the battery cells are connected in parallel and series.

In some implementations, the respective battery cells may not be separated from each other in the battery pack, and only the same sized battery cells each having constant capacity, can be employed to the battery pack. In addition, the battery pack can have limitations in view of extensibility as some cells are capable of outputting only specific capacity which limits the use of certain battery cells in packs.

SUMMARY OF THE INVENTION

Aspects of the present invention provide a battery pack, which includes a plurality of contact portions in a terminal accommodating portion provided in each of cell receiving portions of a plurality of battery cells, so that one selected from the plurality of contact portions can be electrically connected to electrode terminals of the battery cells even if the plurality of battery cells have different widths of wide walls.

Other aspects of the present invention provide a battery pack, which includes a series/parallel switch provided outside an external pack, thereby switching a connection method of a plurality of battery cells provided inside the external pack to series/parallel connection.

Aspects of the present invention further provide a battery pack, which includes a capacity display unit provided outside an external pack to identify capacity of each of a plurality of battery cells provided inside the external pack.

In accordance with one aspect of the present invention, there is provided a battery pack including a plurality of battery cells each having an electrode terminal portion exposed to one surface, and an external pack accommodating the plurality of battery cells and including a plurality of terminal accommodating portions at the interior of a first surface corresponding to the one surface of each of the plurality of battery cells to be electrically connected to the electrode terminal portions of the plurality of battery cells, respectively, wherein the plurality of terminal accommodating portions include a first terminal accommodating portion electrically connected to a first battery cell among the plurality of battery cells, and the first terminal accommodating portion includes a first terminal contact portion making contact with an electrode terminal portion of the first battery cell and one or more first dummy contact portions making contact with one surface of the first battery cell.

The external pack may be box-shaped having an opening and may include a pack case including a plurality of cell receiving portions to receive the plurality of battery cells and a plate-shaped pack cover coupled to the opening of the pack case, the pack case having the first surface shaped as a rectangle facing the opening and a side surface extending a predetermined length from each corner of the first surface.

The pack cover may have one corner rotatably fixed to one side of the opening of the pack case to be rotatable about the one corner as a rotation shaft, and the other corner opposite to the one corner and fixed by a protrusion producing from the other side of the opening.

The one corner of the pack cover may be fixed by a spring or hinge.

The side surface portion of the pack case may include the first side surface, a second side surface facing the first side surface and parallel with the first side surface, and a third side surface and a fourth side surface connecting the first side surface and the second side surface.

The pack case may include one or more partition walls arranged in parallel with the first side surface of the side surface portion and separating the inside of the pack case into a plurality of cell receiving portions.

The plurality of cell receiving portions of the pack case may further include variable barriers arranged in parallel with the third side surface and the fourth side surface and crossing the first side surface, the second side surface and the partition walls.

The battery pack may further include elastic members between the variable barriers and the third side surface.

Electrode terminal portions of the plurality of battery cells may include a negative electrode terminal, a positive electrode terminal and an ID terminal.

The external pack may further include a capacity display unit provided outside the external pack, the capacity display unit electrically connected to the plurality of terminal accommodating portions and displaying capacity levels of the plurality of battery cells measured from the plurality of terminal accommodating portions.

The external pack may further include a plurality of switching devices for switching a connection method of the plurality of battery cells received in the external pack to series/parallel connection.

The external pack may further include a series/parallel switch provided outside, the series/parallel switch electrically connected to the plurality of switching devices and controlling the plurality of switching devices to be driven.

The external pack may further include an input port for supplying power for charging the plurality of battery cells, and an output port for outputting power output when the plurality of battery cells are discharged.

As described above, according to the present invention, since the battery pack includes a plurality of contact portions in a terminal accommodating portion provided in each of cell receiving portions of a plurality of battery cells, one selected from the plurality of contact portions can be electrically connected to electrode terminals of the battery cells even if the plurality of battery cells have different widths of wide walls.

In addition, since the battery pack includes a series/parallel switch provided outside an external pack, a connection method of a plurality of battery cells provided inside the external pack can be switched to series/parallel connection.

Further, since the battery pack includes a capacity display unit provided outside an external pack, capacity levels of a plurality of battery cells provided inside the external pack can be identified.

In another aspect, a battery pack assembly comprises an external pack that defines a plurality of openings to receive a plurality of battery cells of different sizes wherein the plurality of batteries each have an exposed electrode terminal; a plurality of terminal accommodating portions formed on an interior surface of the plurality of openings in the external pack wherein the plurality of terminal accommodating portions are positioned so as to electrically connect with the exposed electrode terminals of battery cells of different sizes; a plurality of variable barriers that are respectively positioned in the plurality of openings in the external pack wherein the plurality of variable barriers are movable within the openings to thereby urge battery cells of different sizes into an orientation where the exposed electrode terminals are in contact with a corresponding terminal accommodating portions.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE PREFERRED EMBODIMENT

Example embodiments of the present invention will now be described in more detail with reference to accompanying drawings, such that those skilled in the art can easily practice the present invention. Throughout the specification, the same reference numerals refer to the same elements.

Figure 1A:
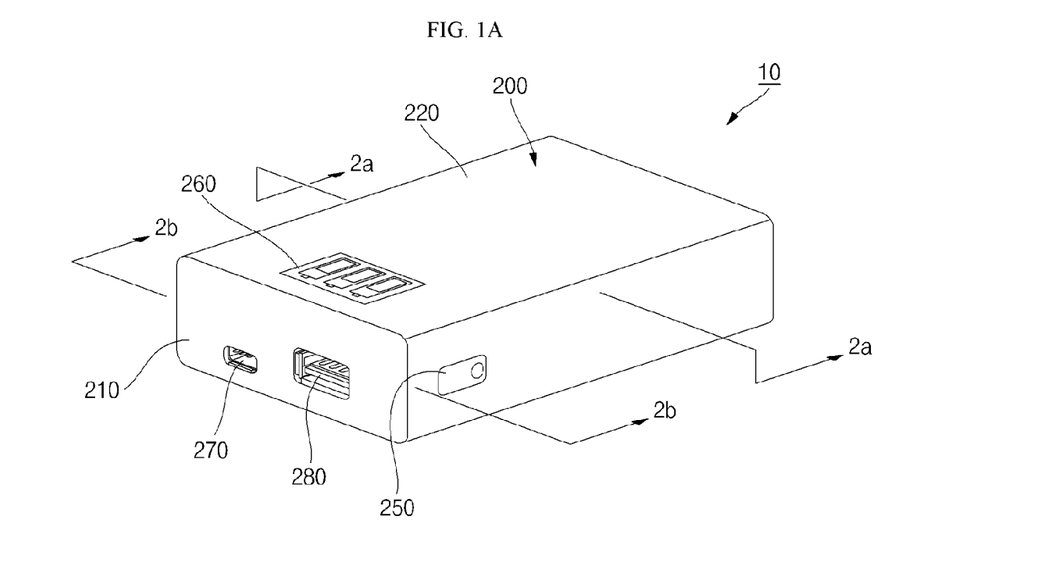
FIGS. 1A and 1B are a perspective view and an exploded perspective view of a battery pack according to an embodiment of the present invention.
Figure 1B:
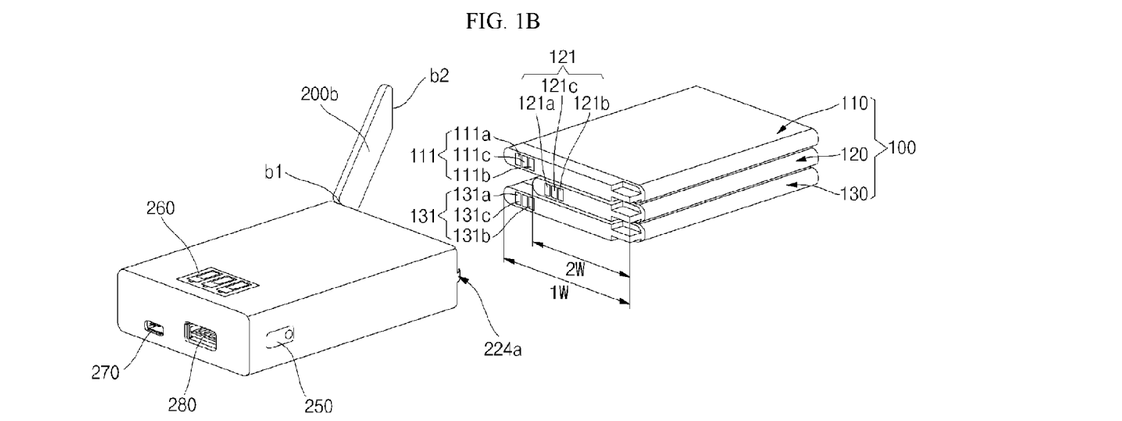
Figure 2A:
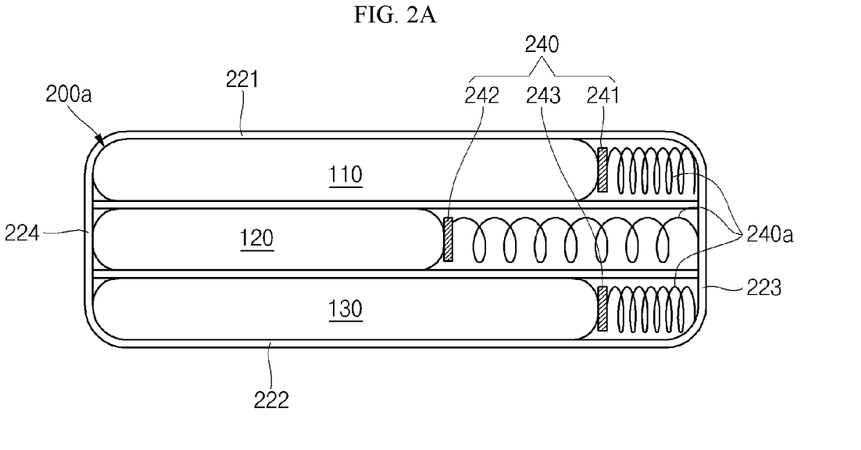
FIGS. 2A and 2B are cross-sectional views taken along lines 2a-2a and 2b-2b of FIG. 1A.
Figure 2B:
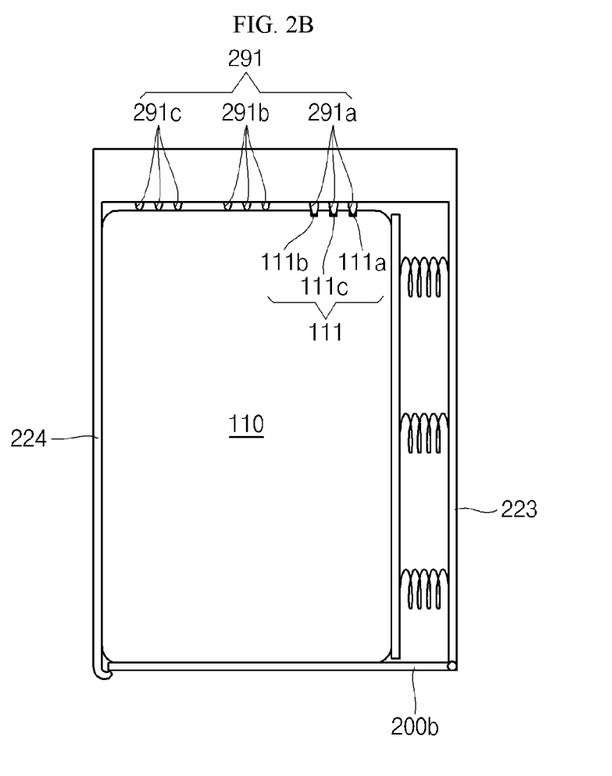
Figure 3:
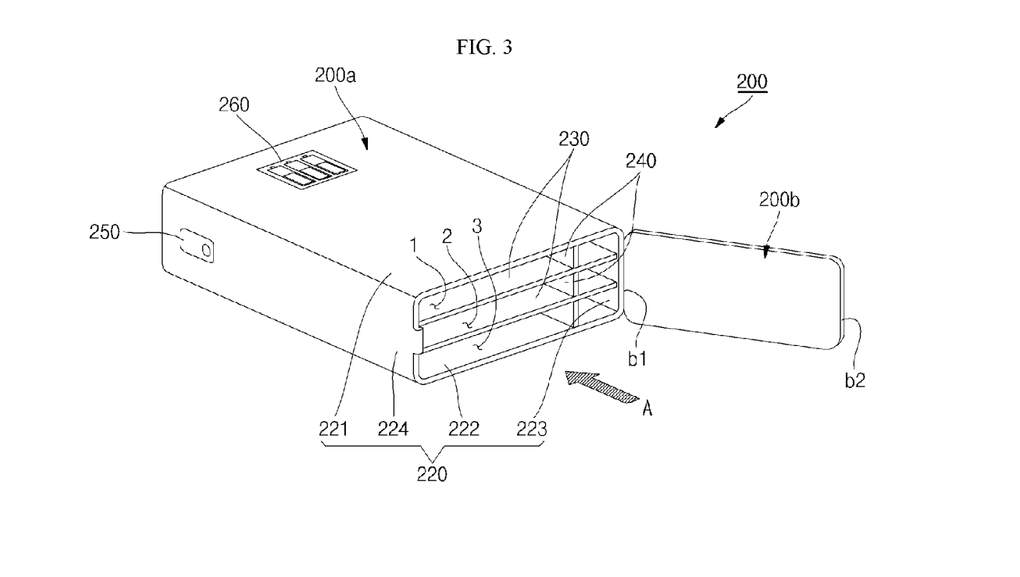
FIG. 3 is a perspective view illustrating an external pack of the battery pack shown in FIGS. 1A and 1B.

FIGS. 1A and 1B are a perspective view and an exploded perspective view of a battery pack according to an embodiment of the present invention, FIGS. 2A and 2B are cross-sectional views taken along lines 2a-2a and 2b-2b of FIG. 1A, and FIG. 3 is a perspective view illustrating an external pack of the battery pack shown in FIGS. 1A and 1B.

Hereinafter, the battery pack 10 shown in FIGS. 1A and 1B will be described with reference to FIGS. 2A, 2B and 3.

As shown in FIGS. 1A and 1B, the battery pack 10 includes a plurality of battery cells 100 having electrode terminal portions 111, 121 and 131 exposed to one surface of each of the plurality of battery cells 100. The battery pack 10 also includes an external pack 200 including a plurality of terminal accommodating portions 291, 292 and 293 that are electrically connected to electrode terminal portions 111, 121 and 131 of the plurality of battery cells 100. The external pack 200 also includes recesses that accommodate the plurality of battery cells 100.

First, the plurality of battery cells 100 include a first battery cell 110, a second battery cell 120 and a third battery cell 130. In this embodiment, the plurality of battery cells 100 include three battery cells, but the present invention does not limit the number of battery cells to three. However, in the following description, this embodiment will be described with a case where the plurality of battery cells 100 include three battery cells. The plurality of battery cells 100 include electrode terminal portions 111, 121 and 131 exposed to one surface of each of the plurality of battery cells 100. The electrode terminal portions 111, 121 and 131 of the respective battery cells 110, 120 and 130 include positive electrodes 111a, 121a and 131a, negative electrodes 111b, 121b and 131b, and ID terminals 111c, 121c and 131c, respectively. The positive electrodes 111a, 121a and 131a and the negative electrodes 111b, 121b and 131b of the respective battery cells 110, 120 and 130 are terminals for charging and discharging the respective battery cells 110, 120 and 130. The ID terminals 111c, 121c and 131c of the respective battery cells 110, 120 and 130 are terminals for checking balance amounts (current amounts) of the respective battery cells 110, 120 and 130. The electrode terminal portions 111, 121 and 131 of the respective battery cells 100 are electrically connected to the plurality of terminal accommodating portions 291, 292 and 293 provided at the interiors of the cell receiving portions of the external pack 200. Each of the battery cells 100 may have one surface, the other surface opposite to the one surface, and a side surface portion connecting the one surface and the other surface. The side surface portion may have opposite wide wall surfaces facing each other, and opposite narrow wall surfaces facing each other. The opposite narrow wall surfaces of the side surface portion are formed to be round, but aspects of the present invention are not limited thereto.

As shown in FIGS. 1B and 2B, among the three battery cells, the second battery cell 120 may have a wide wall surface width 2W smaller than that of the first battery cell 110 or the third battery cell 130. In the illustrated embodiment, the wide wall surface width 2W of the second battery cell 120 is different from that of the first battery cell 110 or the third battery cell 130, but aspects of the present invention are not limited thereto. That is to say, the respective battery cells 110, 120 and 130 may have different wide wall surface widths from each other.

The respective battery cells 100 may be commercial batteries each including a protection circuit for protecting the respective battery cells from over-voltage, over-current and high temperature.

As shown in FIGS. 1A to 3, the external pack 200 includes a pack case 200a box-shaped having a top opening to accommodate the plurality of battery cells 100, and a pack cover 200b plate-shaped coupled to the opening of the pack case 200a.

The pack case 200a includes a first surface 210 shaped as a rectangular plate and opposite to the opening, and side surface portion 220 extending a predetermined length from each corner of the first surface 210. In addition, the pack case 200a further includes a partition wall 230, variable barriers 240 and a plurality of terminal accommodating portions 290. In addition, the pack case 200a may further include a series/parallel switch 250 formed at the exterior of the pack case 200a, a capacity display unit 260, an input port 270 and an output port 280.

The side surface portion 220 includes a first side surface 221, a second side surface 222 opposite to the first side surface 221 and parallel with the first side surface 221, and a third side surface 223 and a fourth side surface 224 connecting the first side surface 221 and the second side surface 222. The third side surface 223 and the fourth side surface 224 are opposite to and parallel each other. The third side surface 223 and the fourth side surface 224 are orthogonal to the first side surface 221 and the second side surface 222. The first side surface 221 and the second side surface 222 of the side surface portion 220 are surfaces contacting wide wall side surfaces of one of plurality of battery cells 110.

The pack cover 200b has one corner b1 rotatably fixed at one side of the opening of the pack case 200a. In addition, the other corner b2 of the pack cover 200b, opposite to the one corner b1, is fixed by a protrusion 224a protruding to the other side of the opening of the pack case 200a.

The one corner b1 of the pack cover 200b is fixed to the third side surface 223 of the pack case 200a to allow the pack cover 200b to be rotatable, thereby opening or closing the opening of the pack case 200a. The one corner b1 of the pack cover 200b may be fixed to the third side surface 223 of the pack case 200a by means of a spring or hinge.

The other corner b2 of the pack cover 200b may be fixed by the protrusion 224a protruding from the fourth side surface 224 to the third side surface 223 of the pack case 200a. The protrusion 224a may be elastic to facilitate attachment and detachment of the pack cover 200b.

The partition wall 230 is substantially plate-shaped and is provided inside the pack case 200a so as to be parallel with the first side surface 221 and the second side surface 222. The partition wall 230 separates the inside of the pack case 200a into a plurality of cell receiving portions 1, 2 and 3 to accommodate the plurality of battery cells. That is to say, the partition wall 230 separates the plurality of battery cells 100 accommodated inside the pack case 200a. The partition wall 230 is fixed at the interior of the pack case 200a to be orthogonal with the third side surface 223 and the fourth side surface 224. The partition wall 230 may be integrally formed with the pack case 200a, but aspects of the present invention are not limited thereto. The partition wall 230 may include one or more partition walls. In the illustrated embodiment, two partition walls 230 are exemplified, but aspects of the present invention are not limited thereto.

For example, two partition walls 230 may be provided to accommodate three battery cells in the pack case 200a. That is to say, the pack case 200a including two partition walls 230 is separated into three cell receiving portions 1, 2 and 3 to accommodate three battery cells 110, 120 and 130. Here, the first battery cell 110 is received in the first cell receiving portion 1, the second battery cell 120 is received in the second cell receiving portion 2, and the third battery cell 130 is received in the third cell receiving portion 3.

Each of the variable barriers 240 is substantially plate-shaped parallel with the third side surface 223 and the fourth side surface 224 of the side surface portion 220 and may be orthogonal to the first side surface 221 and the second side surface 222. In addition, the variable barriers 240 may be orthogonal to the partition wall 230. Preferably, the variable barriers 240 may include a first variable barrier 241, a second variable barrier 242 and a third variable barrier 243 provided in the respective cell receiving portions 1, 2 and 3. That is to say, the first variable barrier 241, the second variable barrier 242 and the third variable barrier 243 are provided in the first cell receiving portion 1, the second cell receiving portion 2 and the third cell receiving portion 3, respectively.

Elastic members 240a may further be provided between the variable barriers 240 and the third side surface 223. The variable barriers 240 are movable by elastic forces of the elastic members 240a in a state in which they are parallel to the third side surface 223 within the respective cell receiving portions 1, 2 and 3 between the first side surface 221 and the partition wall 230, between the second side surface 222 and the partition wall 230 and between the partition walls 230. The elastic members 240a support the respective variable barriers 240 by elastic forces. In addition, the elastic members 240a support and fix the battery cells 110 positioned between the fourth side surface 224 and the variable barriers 240 by elastic forces. The elastic members 240a may include a plurality of elastic members supporting the variable barriers 240 within the respective cell receiving portions 1, 2 and 3.

As shown in FIG. 1B, even if the wide wall surface width 2W of the second battery cell 120 among three battery cells is smaller than that of the first battery cell 110 or the third battery cell 130, the second battery cell 120 may also be fixed to the second cell receiving portion 2 by the variable barriers 240 and the elastic members 240a, as shown in FIG. 2B.

The series/parallel switch 250 is mounted on one surface of the pack case 200a. The series/parallel switch 250 mounted on the fourth side surface 224 is exemplified in the illustrated embodiment, but aspects of the present invention are not limited thereto.

Figure 4:
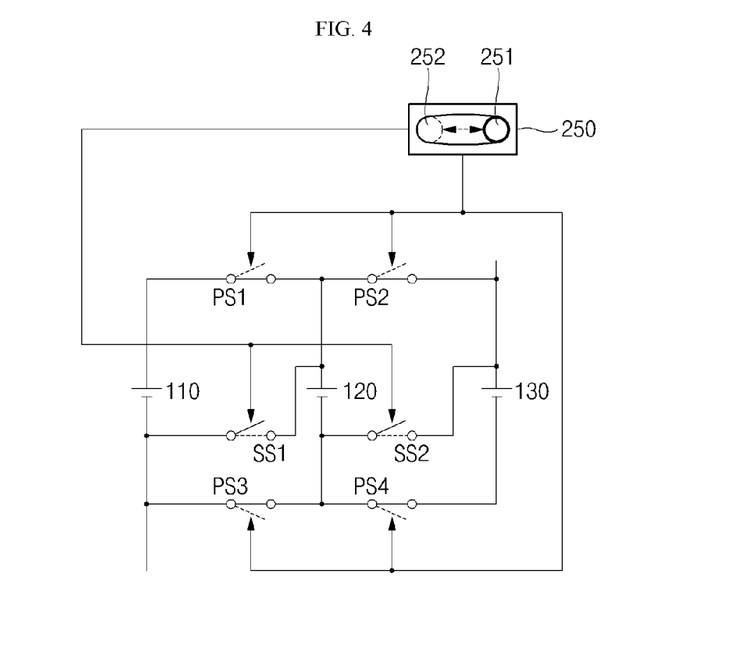
FIG. 4 is a circuit view illustrating a connection mechanism between a series/parallel switch mounted at the external pack shown in FIG. 3 and a plurality of battery cells.

The series/parallel switch 250 controls connections between the plurality of battery cells 100 in series or parallel. As shown in FIG. 4, the series/parallel switch 250 is electrically connected to a plurality of switching devices SS1, SS2, PS1, PS2, PS3, and PS4 to control the connections between the plurality of battery cells 100 in series or parallel. The plurality of switching devices SS1, SS2, PS1, PS2, PS3, and PS4 are turned on or off according to whether the series/parallel switch 250 is activated to select parallel connection 251 or series connection 252. The plurality of switching devices SS1, SS2, PS1, PS2, PS3, and PS4 include a first series switch SS1, a second series switch SS2, a first parallel switch PS1, a second parallel switch PS2, a third parallel switch PS3 and a fourth parallel switch PS4.

The plurality of switching devices SS1, SS2, PS1, PS2, PS3, and PS4 are electrically connected to the plurality of terminal accommodating portions 290 provided within the pack case 200a. FIG. 4 is a circuit view illustrating a connection method of the plurality of switching devices SS1, SS2, PS1, PS2, PS3, and PS4 when the plurality of terminal accommodating portions 290 are electrically connected to the plurality of battery cells 100. Each of the plurality of switching devices SS1, SS2, PS1, PS2, PS3, and PS4 may be provided in a protection circuit provided in the pack case 200a.

The first series switching device SS1 is electrically connected between a negative electrode of the first battery cell 110 and a positive electrode of the second battery cell 120. The first series switching device SS1 is turned on when the series/parallel switch 250 is activated to select series connection 252, thereby electrically connecting the negative electrode of the first battery cell 110 and the positive electrode of the second battery cell 120. In addition, the first series switching device SS1 is turned off when the series/parallel switch 250 is activated to select parallel connection 251, thereby electrically disconnecting the negative electrode of the first battery cell 110 from the positive electrode of the second battery cell 120.

The second series switching device SS2 is electrically connected between the negative electrode of the second battery cell 120 and the positive electrode of the third battery cell 130. The second series switching device SS2 is turned on when the series/parallel switch 250 is activated to select series connection 252, thereby electrically connecting the negative electrode of the second battery cell 120 and the positive electrode of the third battery cell 130. In addition, the second series switching device SS2 is turned off when the series/parallel switch 250 is activated to select parallel connection 251, thereby electrically disconnecting the negative electrode of the second battery cell 120 and the positive electrode of the third battery cell 130. That is to say, the first series switching device SS1 and the second series switching device SS2 are turned on or off by the operation of the series/parallel switch 250.

The first parallel switching device PS1 is electrically connected between the positive electrode of the first battery cell 110 and the positive electrode of the second battery cell 120. The first parallel switching device PS1 is turned on when the series/parallel switch 250 is activated to select parallel connection 251, thereby electrically connecting the positive electrode of the first battery cell 110 and the positive electrode of the second battery cell 120. The first parallel switching device PS1 is turned off when the series/parallel switch 250 is activated to select series connection 252, thereby electrically connecting the positive electrode of the first battery cell 110 and the positive electrode of the second battery cell 120.

The second parallel switching device PS2 is electrically connected between the positive electrode of the second battery cell 120 and the positive electrode of the third battery cell 130. The second parallel switching device PS2 is turned on when the series/parallel switch 250 is activated to select parallel connection 251, thereby electrically connecting the positive electrode of the second battery cell 120 and the positive electrode of the third battery cell 130. The second parallel switching device PS2 is turned off when the series/parallel switch 250 is activated to select series connection 252, thereby electrically disconnecting the positive electrode of the first battery cell 110 from the positive electrode of the second battery cell 120.

The third parallel switching device PS3 is electrically connected between the negative electrode of the first battery cell 110 and the negative electrode of the second battery cell 120. The third parallel switching device PS3 is turned on when the series/parallel switch 250 is activated to select parallel connection 251, thereby electrically connecting the negative electrode of the first battery cell 110 and the negative electrode of the second battery cell 120. The third parallel switching device PS3 is turned off when the series/parallel switch 250 is activated to select series connection 252, thereby electrically disconnecting the negative electrode of the first battery cell 110 from the negative electrode of the second battery cell 120.

The fourth parallel switching device PS4 is electrically connected between the negative electrode of the second battery cell 120 and the negative electrode of the third battery cell 130. The fourth parallel switching device PS4 is turned on when the series/parallel switch 250 is activated to select parallel connection 251, thereby electrically connecting the negative electrode of the second battery cell 120 and the negative electrode of the third battery cell 130. The fourth parallel switching device PS4 is turned off when the series/parallel switch 250 is activated to select series connection 252, thereby electrically disconnecting the negative electrode of the second battery cell 120 from the negative electrode of the third battery cell 130.

The first parallel switching device PS1, the second parallel switching device PS2, the third parallel switching device PS3 and the fourth parallel switching device PS4 are turned on or off in the same manner by the operation of the series/parallel switch 250. In addition, the first parallel switching device PS1, the second parallel switching device PS2, the third parallel switching device PS3 and the fourth parallel switching device PS4 are turned on or off in contrary manners to the first series switching device SS1 and the second series switching device SS2.

That is to say, when the series/parallel switch 250 is activated to select series connection 252, the first battery cell 110, the second battery cell 120 and the third battery cell 130 are connected to each other in series, and when the series/parallel switch 250 is activated to select parallel connection 251, the first battery cell 110, the second battery cell 120 and the third battery cell 130 are connected to each other in parallel.

The battery pack 10 includes the plurality of battery cells 100 connected to each other in parallel by the series/parallel switch 250 and then charged by power applied to the plurality of battery cells 100 connected in parallel through the input port 270. In addition, if the battery pack 10 includes the plurality of battery cells 100 connected to each other in series by the series/parallel switch 250, a high voltage is output through the output port 280.

Figure 5:
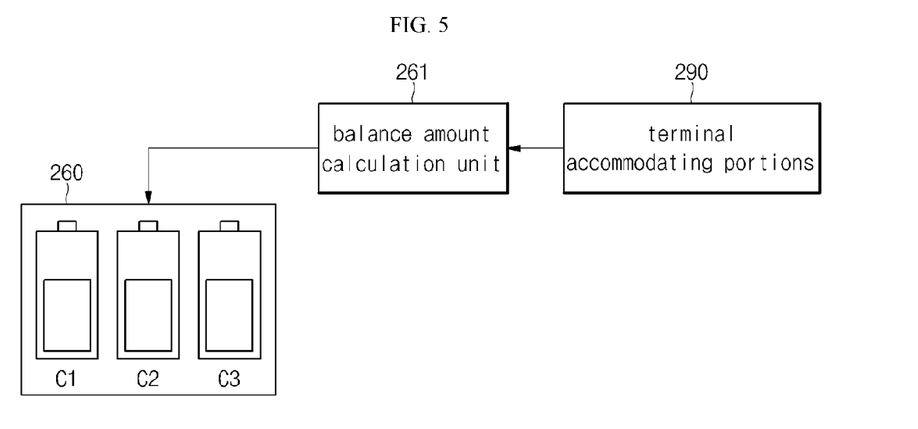
FIG. 5 is a block diagram illustrating a connection mechanism between a series/parallel switch mounted at the external pack shown in FIG. 3 and a plurality of battery cells.

As shown in FIG. 5, the capacity display unit 260 is electrically connected to the plurality of terminal accommodating portions 290 via the balance amount calculation unit 261. The balance amount calculation unit 261 may be included in a protection circuit provided in the pack case 200a. The balance amount calculation unit 261 detects battery balance amounts of the first battery cell 110, the second battery cell 120 and the third battery cell 130 electrically connected to the plurality of terminal accommodating portions 290, and transfers the detected battery balance amounts to the capacity display unit 260. The capacity display unit 260 displays capacity levels C1, C2 and C3 of the plurality of battery cells 110, 120 and 130 received in the pack case 200a. The battery balance amounts of the first battery cell 110, the second battery cell 120 and the third battery cell 130 may be calculated from voltages between each of the positive electrodes 111a, 121a and 131a and each of the negative electrodes 111b, 121b and 131b and current amounts measured by the ID terminals 111c, 121c and 131c.

The input port 270 may be electrically connected to an external power supply source. In the battery pack 10, the plurality of battery cells 100 received in the external pack 200 may be charged by external power applied to the input port 270.

The output port 280 may be electrically connected to an electronic device driven by the power. The battery pack 10 may supply power generated during discharge of the plurality of battery cells 100 received in the external pack 200 to an external device through the output port 280.

Figure 6:
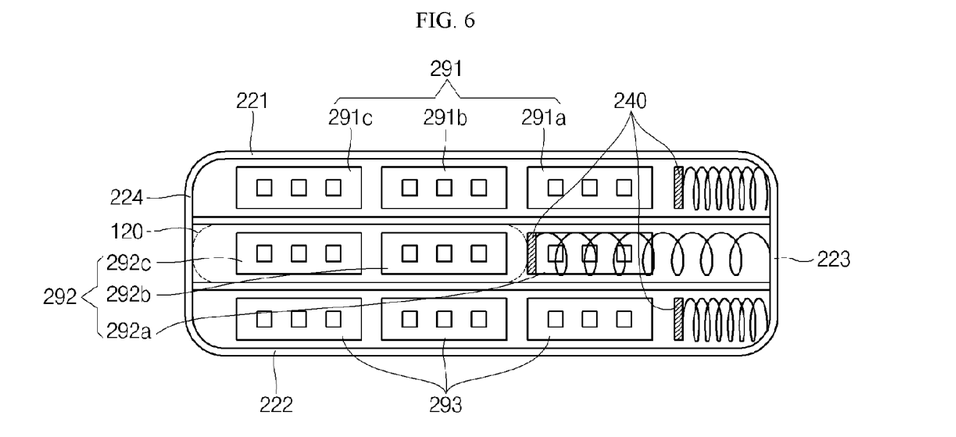
FIG. 6 is an internal diagram illustrating the external pack shown in FIG. 3, viewed in a direction A.

The plurality of terminal accommodating portions 290 are received in accommodating portions of the respective battery cells 100 and are electrically connected to the plurality of battery cells 100 received in the pack case 200a, respectively. As shown in FIG. 6, the plurality of terminal accommodating portions 290 may be formed at the interior of the first surface 210 of the pack case 200a. The plurality of terminal accommodating portions 290 may include a first terminal accommodating portion 291 electrically connected to the first battery cell 110, a second terminal accommodating portion 292 electrically connected to the second battery cell 120, and a third terminal accommodating portion 293 electrically connected to the third battery cell 130. That is to say, the number of the plurality of terminal accommodating portions 290 is equal to the number of the plurality of battery cells 100. The respective terminal accommodating portions 291, 292 and 293 may include terminal contact portions and one or more dummy contact portions.

The first terminal accommodating portion 291 includes a first terminal contact portion 291a contacting the electrode terminal portion 111 of the first battery cell 110, and one or more first dummy contact portions 291b and 291c contacting one surface of the first battery cell 110 having the electrode terminal portion 111 formed thereon. For example, the first terminal accommodating portion 291 may include three contact portions 291a, 291b and 291c, as shown in FIG. 2B. The three contact portions 291a, 291b and 291c, that is, the first terminal contact portion 291a and the first dummy contact portions 291b and 291c, include three terminals to be electrically connected to the positive electrode 111a, the negative electrodes 111b and the ID terminal 111c of the first battery cell 110. In the first terminal accommodating portion 291, as shown in FIG. 2B, the contact portion adjacent to the third side surface 223, that is, the first terminal contact portion 291a, is electrically connected to the first battery cell 110.

If a wide wall surface width 2W of the second battery cell 120 is smaller than that of the first battery cell 110, the centrally positioned contact portion 292b among the three contact portions 292a, 292b and 292c, is the terminal contact portion 292b contacting the electrode terminal of the second battery cell 120.

That is to say, in the battery pack 10 according to the present invention, even if the plurality of battery cells 110, 120 and 130 have different wide wall surface widths, they can be securely fixed in the cell receiving portions 1, 2 and 3 by the variable barriers 240, respectively. In addition, in the battery pack 10 according to the present invention, even if the plurality of battery cells 110, 120 and 130 have different wide wall surface widths, since the terminal accommodating portions respectively provided in the cell receiving portions 1, 2 and 3 include a plurality of contact portions, one selected from the plurality of contact portions may be electrically connected to the electrode terminal of each of the battery cells 110, 120 and 130.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A battery pack comprising:
a plurality of battery cells each having an electrode terminal portion exposed to one surface;
an external pack accommodating the plurality of battery cells and including a plurality of terminal accommodating portions at the interior of a first surface corresponding to a first surface of each of the plurality of battery cells to be electrically connected to the electrode terminal portions of the plurality of battery cells, respectively,
wherein the plurality of terminal accommodating portions include a first terminal accommodating portion electrically connected to a first battery cell among the plurality of battery cells, and the first terminal accommodating portion includes a plurality of terminal contact portions each shaped corresponding to the electrode terminal portion of the first battery cell, wherein the terminal contact portions of a first terminal accommodation portion of the plurality of terminal accommodation portions electrically contacts the electrode terminal portion of the first battery cell, and the remaining terminal contact portions of the remaining plurality of terminal accommodation portions contact the first surface of the first battery cell; and
wherein the external pack further comprises a variable barrier that engages a second surface of the first battery pack to as to urge the first battery pack in a first direction within the external pack and wherein the plurality of terminal accommodations portions that contact the first surface of the first battery are spaced apart in the first direction
wherein the external pack is box-shaped having an opening and includes a pack case including a plurality of cell receiving portions to receive the plurality of battery cells and a plate-shaped pack cover coupled to the opening of the pack case, the pack case having the first surface shaped of a rectangle facing the opening and a side surface portion extending a predetermined length from each cover of the first surface.

2. The battery pack of claim 1, wherein the pack cover has one corner rotatably fixed to one side of the opening of the pack case to be rotatable about the one corner as a rotation shaft, and the other corner opposite to the one corner and fixed by a protrusion protruding from the other side of the opening.

3. The battery pack of claim 2, wherein the one corner of the pack cover is fixed by a spring or hinge.

4. The battery pack of claim 1, wherein the side surface portion of the pack case includes a first side surface, a second side surface facing the first side surface and parallel with the first side surface, and a third side surface and a fourth side surface connecting the first side surface and the second side surface.

5. The battery pack of claim 4, wherein the pack case includes one or more partition walls arranged in parallel with the first side surface of the side surface portion and separating the inside of the pack case into the plurality of cell receiving portions.

6. The battery pack of claim 5, wherein the plurality of cell receiving portions of the pack case further include variable barriers arranged in parallel with the third side surface and the fourth side surface and crossing the first side surface, the second side surface and the partition walls.

7. The battery pack of claim 6, further comprising elastic members between the variable barriers and the third side surface.

8. The battery pack of claim 1, wherein the electrode terminal portions of the plurality of battery cells each include a negative electrode terminal, a positive electrode terminal and an ID terminal.

9. The battery pack of claim 1, wherein the external pack further includes a capacity display unit provided outside the external pack, the capacity display unit electrically connected to the plurality of terminal accommodating portions and displaying capacity levels of the plurality of battery cells measured from the plurality of terminal accommodating portions.

10. The battery pack of claim 1, wherein the external pack further includes a plurality of switching devices for switching a connection method of the plurality of battery cells received in the external pack to series/parallel connection.

11. The battery pack of claim 10, wherein the external pack further includes a series/parallel switch provided outside, the series/parallel switch electrically connected to the plurality of switching devices and controlling the plurality of switching devices to be driven.

12. The battery pack of claim 1, wherein the external pack further comprises:
an input port for supplying power for charging the plurality of battery cells; and
an output port for outputting power output when the plurality of battery cells are discharged.

13. A battery pack assembly comprising:
an external pack that defines a plurality of openings to receive a plurality of battery cells of different sizes wherein the plurality of battery cells each have an exposed electrode terminal;
a plurality of terminal accommodating portions formed on an interior surface of the plurality of openings in the external pack wherein the plurality of terminal accommodating portions are positioned so as to electrically connect with the exposed electrode terminals of the battery cells of different sizes; and
a plurality of variable barriers that are respectively positioned in the plurality of openings in the external pack wherein the plurality of variable barriers are movable within the openings to thereby urge the battery cells of different sizes into an orientation where the exposed electrode terminals are in contact with a corresponding terminal accommodating portion of the plurality of terminal accommodating portions wherein the plurality of variable barriers exert force against the plurality of batteries in a first direction and wherein the plurality of terminal accommodations portions are formed on the interior surface of the plurality of openings of the external pack so as to be spaced apart in the first direction,
wherein the external pack is box-shaped having an opening and includes a pack case including a plurality of cell receiving portions to receive the plurality of battery cells and a plate-shaped pack cover coupled to the opening of the pack case, the pack case having the first surface shaped of a rectangle facing the opening and a side surface portion extending a predetermined length from each cover of the first surface.

14. The battery pack assembly of claim 13, wherein the external pack has two opposed side walls, a top and bottom wall, a front wall, and a back wall opposed to the front wall having an opening that receives the plurality of battery cells.

15. The battery pack assembly of claim 14, wherein the plurality of terminal accommodating portions are formed on the front wall of the external pack so as to extend between the side walls.

16. The battery pack assembly of claim 14, wherein the external pack includes partition walls that extend between the side walls so as to be substantially parallel to the top and bottom walls and wherein the plurality of partition walls define spaces that receive the plurality of battery cells.

17. The battery pack assembly of claim 16, wherein the plurality of variable barriers are formed between the partition walls and are movable in a direction between the side walls.

18. The battery pack assembly of claim 17, wherein the variable barriers are spring biased away from one side wall and towards the other side wall.

19. The battery pack assembly of claim 14, further comprising a cover that is positioned over the opening so as to retain the plurality of battery cells within the external pack.

* * * * *